Aug. 17, 1954

J. W. DEHN

TRANSLATOR 2,686,838

Filed April 6, 1950

4 Sheets-Sheet 1

INVENTOR
J. W. DEHN
BY J W Schmied
ATTORNEY

Aug. 17, 1954

J. W. DEHN

TRANSLATOR 2,686,838

Filed April 6, 1950

4 Sheets-Sheet 2

INVENTOR
J. W. DEHN
BY J W Schmied
ATTORNEY

Aug. 17, 1954 J. W. DEHN 2,686,838

TRANSLATOR

Filed April 6, 1950

4 Sheets-Sheet 3

INVENTOR
J. W. DEHN
BY J W Schmied
ATTORNEY

Aug. 17, 1954

J. W. DEHN

TRANSLATOR 2,686,838

Filed April 6, 1950

4 Sheets-Sheet 4

INVENTOR
J. W. DEHN
BY J. W. Schmied
ATTORNEY

Patented Aug. 17, 1954 2,686,838

UNITED STATES PATENT OFFICE 2,686,838

TRANSLATOR

Joseph W. Dehn, Great Neck, N. Y., assignor to Bell Telephone Laboratories, Incorporated, New York, N. Y., a corporation of New York Application April 6, 1950, Serial No. 154,406

36 Claims. (Cl. 179—18)

The present invention relates generally to translating arrangements and more particularly to electrical translating arrangements. The invention may be applied, for instance, to interpret plural character codes in the field of automatic telephone switching systems.

The invention is particularly but not exclusively adapted to use in automatic cross-bar telephone switching systems of the type disclosed in Patent 2,585,904 to A. J. Busch of February 19, 1952. The varieties of the invention which are disclosed herein are arranged to be incorporated in such a system.

In the system disclosed by Busch, among other aspects of the disclosure, subscribers' lines terminate on line link frame switches and trunks and originating registers terminate on trunk link frame switches. Various connector circuits are provided whereby markers may have access to line link frames, trunk link frames, etc., for the purpose of completing connections between lines and trunks, lines and originating registers, lines and markers, originating registers and markers, etc. The present invention has been illustrated herein as embodied in the originating register circuit of such a system.

As an incident to the successful completion of a connection initiated by a subscriber, the subscriber's line circuit is interconnected with an originating register circuit. Upon the transmission of the usual dial tone signal from such a register to the calling subscriber the latter commences to dial the called number. It is one of the functions of such a register circuit to detect, count and register the successive digits dialed by the calling subscriber. It is another function of such a circuit to effect the seizure of an idle marker circuit at the proper time in order that such marker can effect subsequent switching operations pursuant to completing the desired interconnection as determined by the called number.

In regard to the function of the originating register circuit of seizing an idle marker, the present invention is useful in determining in part when such seizure shall take place by controlling the time of such seizure depending upon a translation of the called office code which will be determinant in certain cases of the time of seizure. Normally, in a system such as is disclosed by Busch, where a basic seven-digit numbering plan is used (three office code digits followed by four station line numericals), the originating register is arranged to start a marker seizure operation after the seventh digit has been detected, counted and registered.

There are variations, of course, whereunder marker seizure is initiated after less than seven digits where the office code indicates a special condition, such as 11X prefix code which may indicate a service code or a toll switching prefix, etc. Under these special circumstances the originating register may be provided with translating means controlled by the office code or prefix digits to effect marker seizure after say three digits.

Another special arrangement occurs when office codes are encountered which indicate that a party letter (eighth digit) will follow the usual seven basic digits. In these cases it is, of course, necessary for an originating register to delay marker seizure for a period of time after registration of the seventh digit within which an eighth or party digit may be registered if such be forthcoming. Provision has been made heretofore in originating register circuits for recognizing such special office codes and for delaying marker seizure long enough to ensure registration of the additional digit. Such provision has taken the form of code translators which translate the called office code into one of two indications, namely, marker start after seven digits or marker start after seven digits plus "stations delay." This "stations delay" indication merely provides a time delay (say from three to five seconds for instance), such as by a resistance-condenser time constant circuit for firing a gas tube, after registration of seven digits and before marker seizure. This delay time provides sufficient time for registration of the party digit if such additional digit is forthcoming.

The present invention relates particularly to translating arrangements for plural character codes such as the above office code of these digits.

One object of the present invention is to provide a translating arrangement comprising means, such as register relays, for registering plural character codes, such as three-digit office codes, and a group of conductors, say five, for each code character, wherein the registering means is responsive to registration therein of code characters to establish the potential of a certain set of conductors of each group according to the registered code, say grounds two out of five conductors of each group, and an indicating device, such as a relay, for each code in circuit with all conductors of one set of each group, say that set of conductors whose potentials are not established by the operation of the registering means. In such an arrangement the relay, or other indicating device, will operate for all codes except the one peculiar to it and the originating register is thereby made capable of distinguishing between office codes requiring different numbers of digits. For instance, as disclosed herein by example, an indicating device, say a relay, may be provided for each three-digit code which requires the basic seven digits plus a party letter. The originating register may be arranged with a translating arrangement according to the invention whereby each of these indicating relays will operate for every office code which requires seven digits and will operate for every office code which requires eight digits except the office code particular to itself. When all relays are operated together (indicating a seven-digit code) a circuit may be completed for effecting marker seizure after seven digits. Whenever any one relay is released (indicative of an eight-digit code) another circuit will be completed which injects the above-mentioned "stations delay" period prior to marker seizure after registration of seven digits.

The main purpose of the invention is to provide novel translating arrangements applicable to many situations and particularly applicable to the above-described originating register functions.

The above-outlined invention is described in detail hereinafter in connection with the drawings which form a part of the disclosure and which may be described generally as follows.

Figure 3:
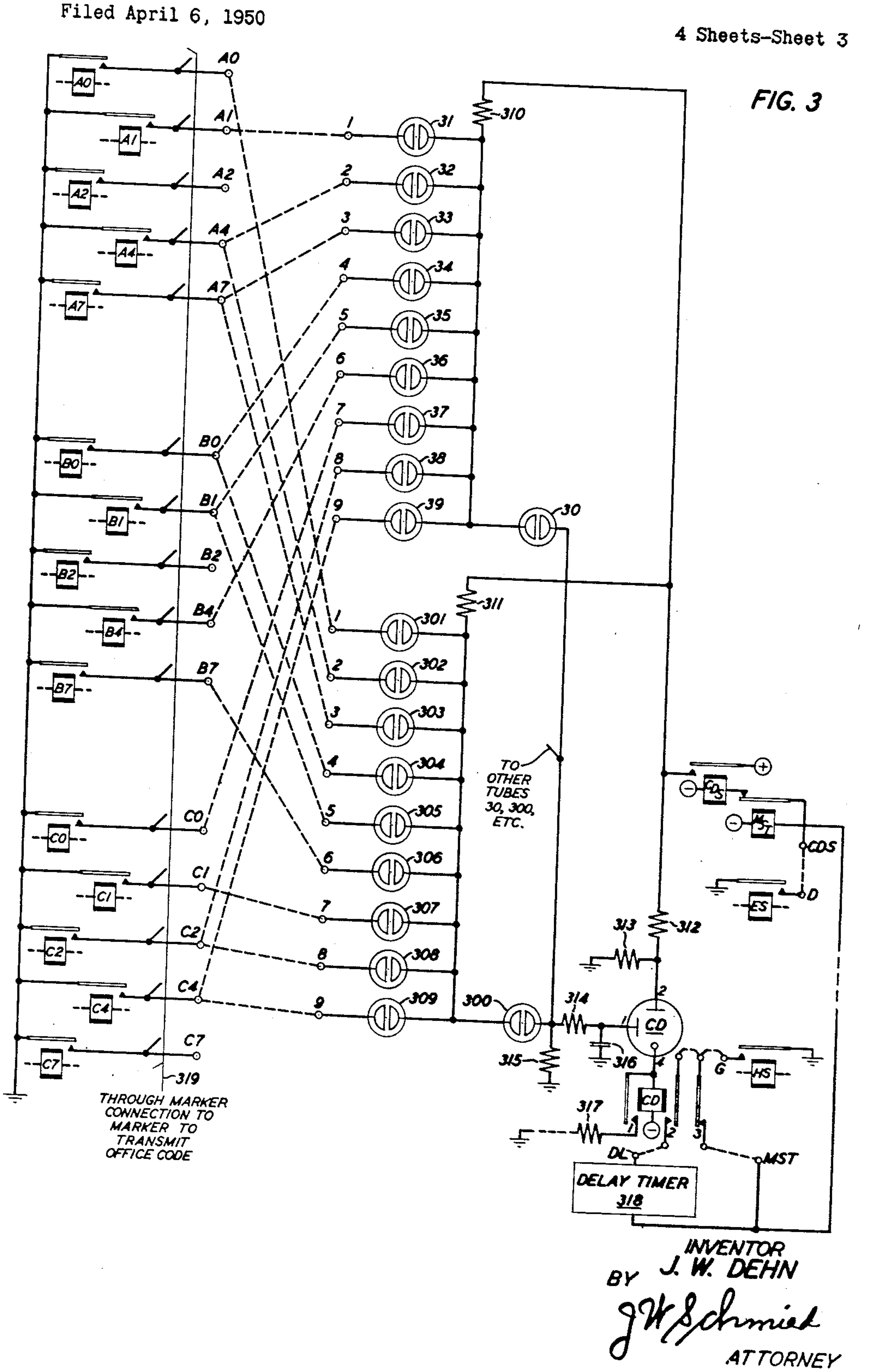
Figure 4:
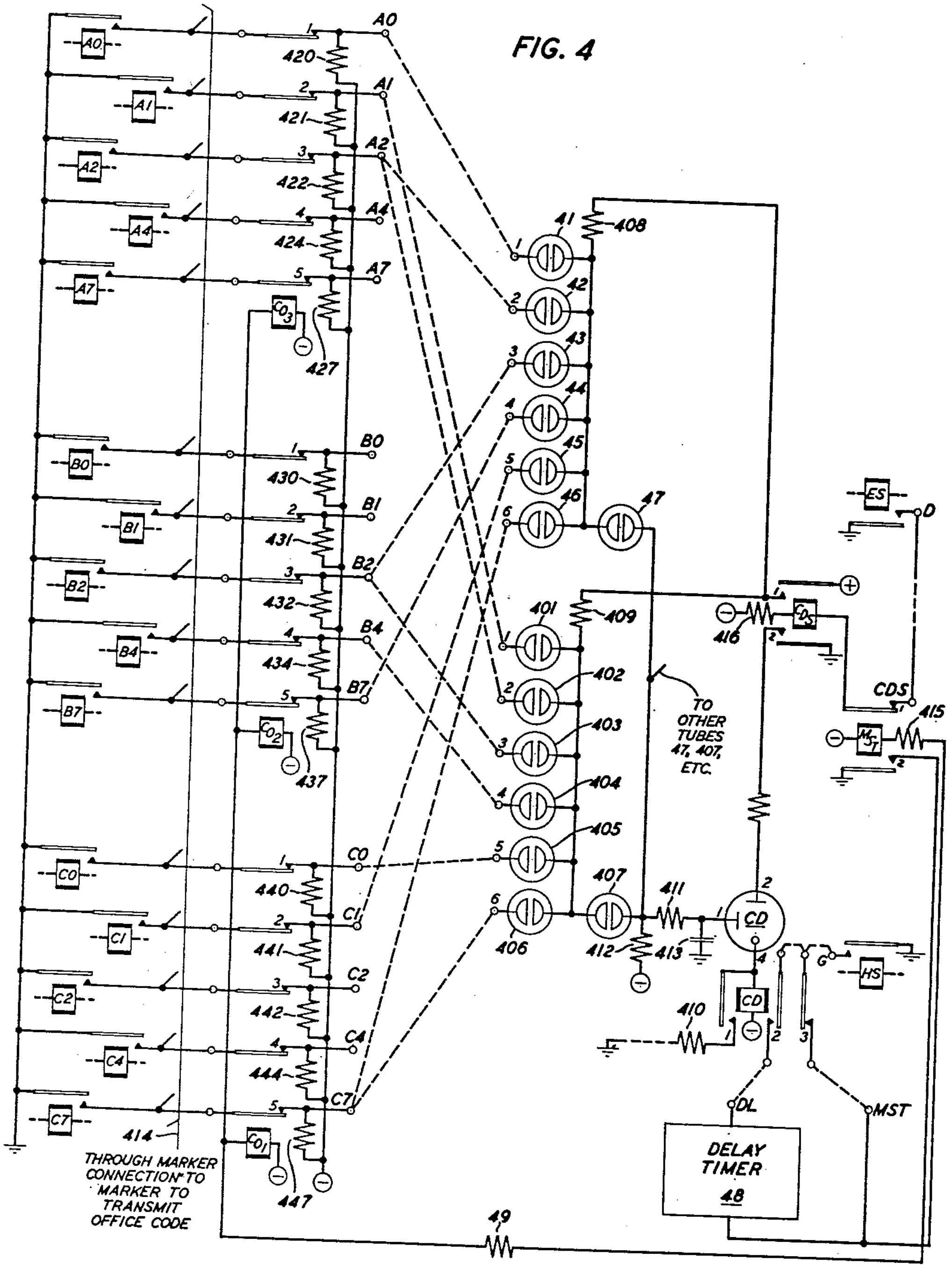

Figs. 3 and 4 disclose two varieties of the invention employing gas tubes.

*General description*

Since the present invention is illustrated as embodied in an originating register circuit, only sufficient detail is shown and described as will make the invention understandable. As has been outlined above, an originating register circuit, among other functions, is arranged to register called number digits and, depending upon a translation of the office code, to start marker seizure after the basic seven digits have been registered or after seven digits plus "stations delay." In the varieties of the invention disclosed herein by way of example, only the office code register relays have been shown and the detailed description covers only some of those functions which occur between the time that the three office code digits are registered and the time when marker seizure is initiated. An understanding of other parts of the entire system may be obtained from the above-identified Busch patent, the disclosure of which is considered as part of the present disclosure.

*Detailed description*

In Figs. 1, 2, 3 and 4, the three groups of relays A0 to A7, B0 to B7 and C0 to C7 represent the A, B, and C office code digit registers in an originating register circuit.

It is to be understood that any showing of a source of voltage polarity presupposes, unless otherwise stated, that the opposite polarity of the same source is grounded.

Figure 1:
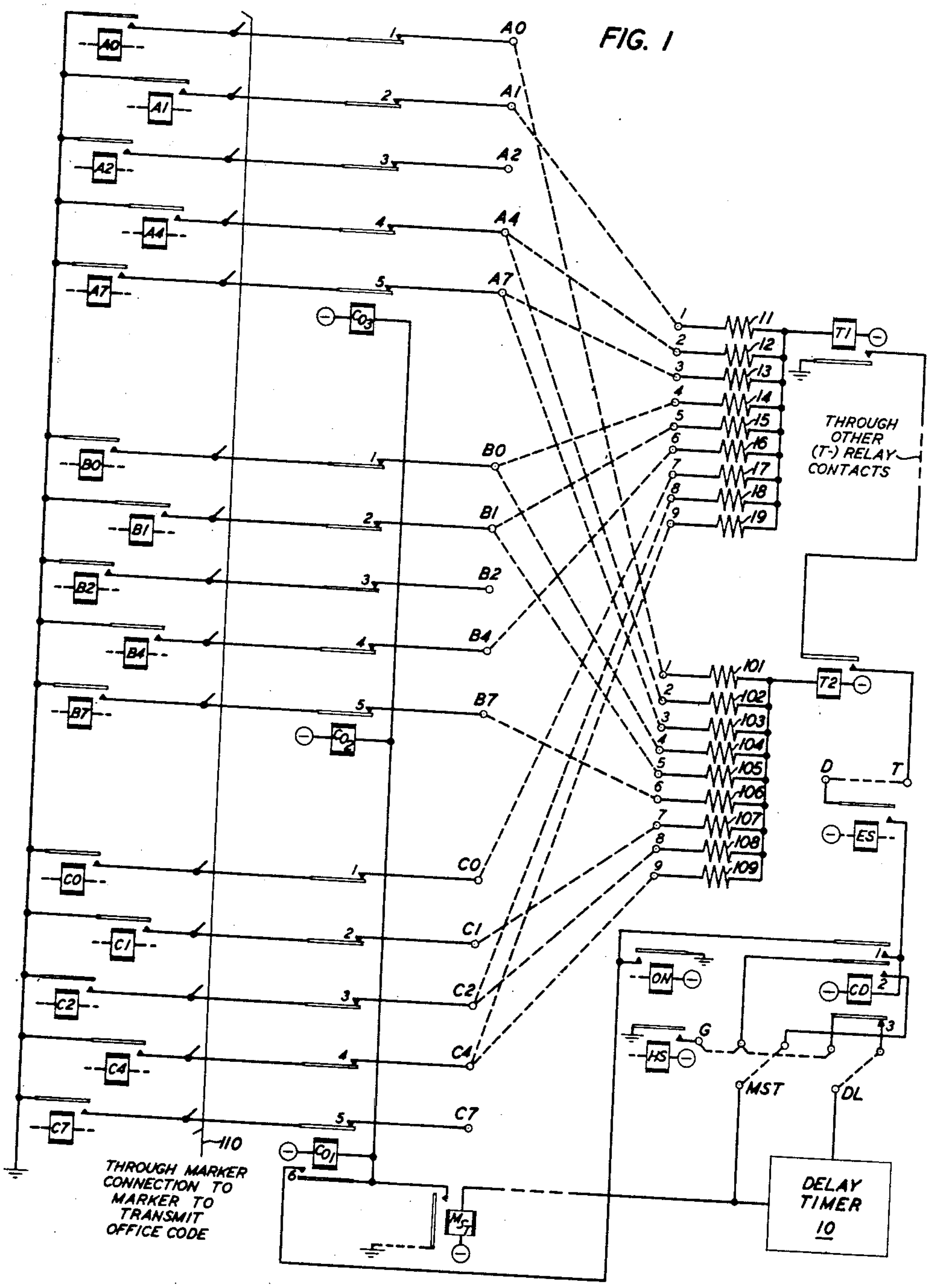
Fig. 1 shows one variety of the invention using relays and as embodied in an originating register circuit.

In Fig. 1 relays T1(1) and T2(1) each correspond to an office code, say 298 and 367, respectively, which requires seven basic digits plus a stations delay time interval. (Expressions such as T2(1) means element T2 in Fig. 1, etc.) The winding of each such relay is connected to nine punchings through nine different resistances, such as resistances 11 to 19 for relay T1(1) and resistances 101 to 109 for relay T2(1), etc. A different group of three resistances for any one relay, such as relay T1(1), is cross-connected to three punchings associated with each of the three office code digit registers such that whenever the code peculiar to a particular relay, such as 298 for relay T1(1), is registered in the office code digit register relays, the two punchings grounded by the register groups will not ground any of the resistances of relay T1(1). However, whenever any other code is registered, at least one of the resistances 11 to 19 will be grounded thereby to operate relay T1(1). In other words, relay T1(1) will operate for any code except its own.

It is assumed that a relay such as T1(1) or T2(1) is provided for each office code which requires eight digits and that all other office codes require seven digits. It is assumed that the code 298 requires seven digits plus stations delay (eight digits) and that relay T1(1) represents that code. It is further assumed that code 367 is another eight-digit code represented by relay T2(1).

When an office code of three digits is registered in the register relays of Fig. 1, the register relays will be operated in accordance with the following well-known two-out-of-five code.

| Digit | Relays Operated | Digit | Relays Operated |
|---|---|---|---|
| 1 | A0, A1 | 6 | A2, A4 |
| 2 | A0, A2 | 7 | A0, A7 |
| 3 | A1, A2 | 8 | A1, A7 |
| 4 | A0, A4 | 9 | A2, A7 |
| 5 | A1, A4 | 0 | A4, A7 |

In response to the seven-digit office code 255, for instance, relays A0(1), A2(1) and B1(1), B4(1) and C1(1), C4(1) will be operated according to the above table. The originating register off-normal relay ON(1) will of course be operated as soon as the register is seized.

In response to the registration of the office code 255 there are completed three operating paths for relay T1(1) and four operating paths for relay T2(1). Relay T1(1) operates in a circuit extending from battery, through the winding of relay T1(1) in parallel through resistances 15, 16 and 19 to punchings 5, 6 and 9 of relay T1(1), punchings B1(1), B4(1) and C4(1), contacts 2 and 4 of relay CO2(1) and 4 of relay CO1(1), to grounds over contacts of relays B1(1), B4(1) and C4(1). Relay T2(1) operates in a circuit extending from battery, through the winding of relay T2(1) in parallel through resistances 101, 105, 107, and 109, to punchings 1, 5, 7 and 9 of relay T2(1), punchings A0(1), B1(1), C1(1) and C4(1) contacts 1 of relay CO3(1) and 2 of relay CO2(1) and 2 and 4 of relay CO1(1), to grounds over contacts of relays A0(1), B1(1), C1(1) and C4(1). It is to be understood that any single such parallel circuit would operate either relay and that it is necessary only that at least one resistance 11 to 19 or 101 to 109 be grounded in order to operate the associated relay.

The fact that both of the relays T1(1) and T2(1) operated as a result of the registration of the code 255 indicates that this code requires a marker seizure after the basic seven digits. In the system disclosed by Busch and Dehn one set of five registration conductors is provided for transferring the digits as they are counted in the originating register to register relays such as relays A0 to A7, B0 to B7, etc. These five conductors are "steered" to the proper group of five register relays by "steering" relays such as relays ES(1) and HS(1). A steering relay AS (not shown) operates to steer the "A" digit to the "A" register relays A0(1) to A7(1); a "B" digit steering relay BS (not shown) steers the "B" digit to the "B" digit register relays B0(1) to B7(1), etc. It is a fact that the relay BS (not shown) operates after the registration of the first or "A" digit; the relay CS (not shown) operates after the registration of the second or "B" digit, etc; the relay ES(1) operates after the registration of the fourth or "D" digit, etc.; the relay HS(1) operates after the registration of the seventh or "G" digit, etc.

After the fourth or "D" digit has been registered, the steering relay ES(1) operates. Relay ES(1), upon operating, completes a circuit for operating relay CD(1). Such circuit extends from ground, over the contact of relay T1(1), over similar contacts of other relays T– (not shown) whose contacts will be closed for a seven-digit code, contact of relay T2(1), contact of relay ES(1), to battery through the winding of relay CD(1). Relay CD(1) operates and locks over its contact 1 to ground over the contact of the off-normal relay ON(1). Relay ES(1) releases at the start of the sixth or "F" digit.

After the seventh or "G" digit has been registered, the steering relay HS(1) operates. Relay HS(1), upon operating, operates the marker start relay MST(1) to start the seizure of an idle marker circuit. Relay MST(1) operates in a circuit extending from ground, over the contact of relay HS(1), punching G(1), contact 2 of relay CD(1), punching MST(1), to battery through the winding of relay MST(1). Relay MST(1), upon operating, starts the circuit operations necessary to a seizure of an idle marker circuit and operates relays CO1(1), CO2(1) and CO3(1) in an obvious circuit over the contact of relay MST(1). Relays CO1(1), CO2(1) and CO3(1) lock over contact 6 of relay CO1(1), to ground over the contact of relay ON(1). Relays CO1(1), CO2(1) and CO3(1) are operated for the purpose of permitting a seized marker to have access to the register relays A0(1) to A7(1), B0(1) to B7(1), etc., over cable 110 without interference from the circuits of relays T1(1), T2(1), etc.

From the above description it will be apparent that whenever a seven-digit code is registered all of the relays T1(1), T2(1), etc., will be operated thereby completing a circuit under control of each for operating relay CD(1), the operation of relay CD(1) controlling the marker seizure after the seventh digit is registered.

As will be described presently, whenever an eight-digit code, such as 298 or 367, is registered, the associated relay T1(1) or T2(1), etc., will not be operated thereby preventing the operation of relay CD(1), the release of relay CD(1), as will be seen, controlling the marker seizure after seven digits plus a delay interval sufficient for registration of an eighth or party digit.

When the eight-digit code 298 is registered relays A0(1), A2(1), B2(1), B7(1), C1(1) and C7(1) will be operated. Under these conditions it will be observed that none of the nine resistances 11 to 19 of relay T1(1) is grounded because the three groups of three resistances for this relay T1(1), which are associated respectively with the three digit registers A0(1) to A7(1), B0(1) to B7(1), and C0(1) to C7(1), are connected to only those punchings A0(1) to C7(1) which are not grounded for this code. Therefore relay T1(1) will not operate. By inspection, it will be observed that relay T2(1), however, may and does operate over any one or all of three different circuits established through resistances 101, 106 and 107.

The fact that one of the relays T– is not operated prevents relay CD(1) from operating at the end of the fourth digit when relay ES(1) operates. Later, after the registration of the seventh or "G" digit, when relay HS(1) is operated, a circuit is completed for operating relay MST(1); but, this circuit is completed through a delay timer 10 which delays the operation of relay MST(1) until say from three to five seconds have elapsed after the operation of relay HS(1). This delay period will insure that the eighth or party digit, if any, is registered before an idle marker is seized. This marker start circuit extends from ground, over the contact of relay HS(1), punching G(1), contact 3 of relay CD(1), punching DL(1) to delay timer 10. This timer 10 may take any known form of circuit or apparatus which will recognize a potential input condition, such as ground, and which will apply a potential to its output, say ground potential, after the lapse of a measured time interval, say from three to five seconds. In the Busch patent this timer 10 takes the form of a gas tube which is fired some three to five seconds after input ground is applied to a relay which controls a condenser-resistance-time-constant circuit. The firing of the gas tube is effective to operate relay MST(1) after the lapse of the "stations delay" period. The operation of relay MST(1) performs the same functions as previously.

From the latter description it will be apparent that whenever an eight-digit code is registered, one of the relays T1(1), T2(1), etc., will remain released thereby preventing the operation of relay CD(1) to inject a "stations delay" time interval between the operation of steering relay HS(1) and the start of marker seizure operations. In this instance it will be observed that the eight-digit code is recognized by the failure of its associated relay to operate, this non-operation being the result of the particular variety shown of the present invention comprising the translating arrangement.

If the eight-digit code 367, which is peculiar to relay T2(1), were registered, then relays A1(1), A2(1), B2(1), B4(1), C0(1) and C7(1) would be operated. Inspection of Fig. 1, in view of previous detailed description, will show that relay T1(1) will be operated over any one of the circuits including resistances 11, 16 or 17. Relay T2(1), however, will not operate because none of its resistances 101 to 109 is grounded by the register relays. Thus relay CD(1) will not be operated and the delay timer 10 is again effective to inject the "stations delay" time delay period into the marker start operation.

Figure 2:
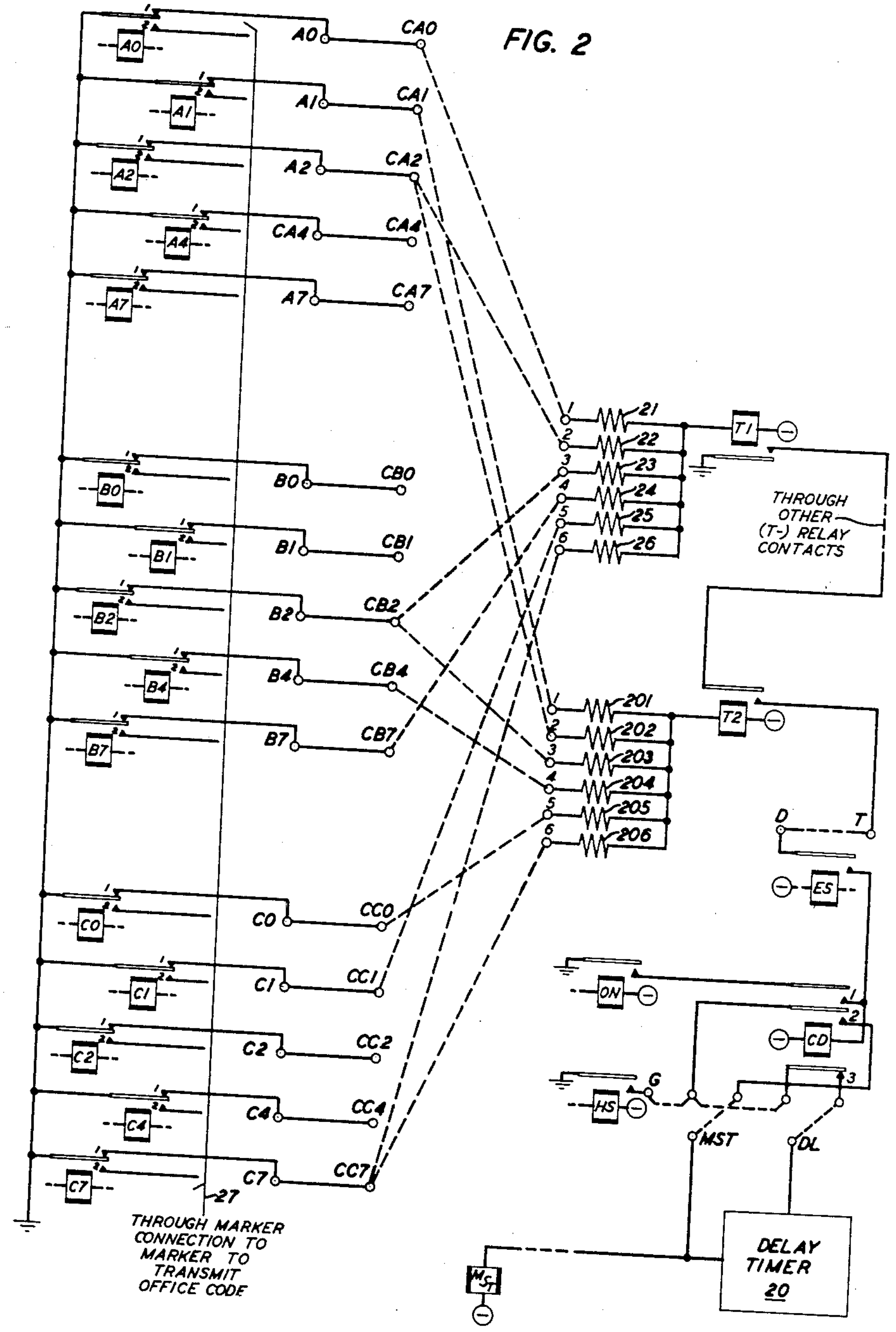
Fig. 2 illustrates another relay variety of the present invention.

In the arrangement shown in Fig. 2 only six resistances are provided for each code relay, such as resistances 21 to 26 for relay T1(2) for code 298 and resistances 201 to 206 for relay T2(2) for code 367. Only six resistances are necessary here because the code relays T1(2), T2(2), etc., are controlled from back contacts 1 of the register relays A0(2) to A7(2), B0(2) to B7(2), and C0(2) to C7(2) instead of the front contacts 2 as in the arrangement of Fig. 1. In the embodiment of Fig. 2 a code relay, such as T1(2), will remain released whenever the pertinent code, say 298, is registered in the register relays because under those conditions all of the resistances, such as 21 to 26, will be open-circuited at the back contacts 1 of the relays A0(2), A2(2), B2(2), B7(2), C1(2) and C7(2) which are the only ones operated in registering the code 298. For any code other than the one peculiar to the code relay, such as relay T1(2), at least one of the associated resistances will be grounded over a back contact 1 of one of the register relays. The operations incident to marker start operations with or without stations delay are identical to the same operations previously described in connection with the embodiment shown in Fig. 1 except that no connector relays such as relays CO1(1), CO2(1) and CO3(1) of Fig. 1 are required. This elimination of connector relays is permissible because the marker has access to only front contacts 2 of the register relays over cable 27 and there is thus no chance of interference from the code relay circuits since they are associated only with back contacts 1 of the register relays.

The embodiments shown in Figs. 3 and 4 utilize gas tube circuits and arrangements to perform translating functions similar to those above described in connection with Figs. 1 and 2. In these arrangements the operation of relay CD(3) or CD(4) depends upon the firing of the associated gas tube CD(3) or CD(4). Thus whenever tube CD(3) or CD(4) is fired, such must be the result of registration of an office code which requires the use of the delay timer such as timer 318 or 48. In this respect relay CD(3) and relay CD(4) correspond to relay CD(1) of Fig. 1. As will be appreciated, the gas tubes such as 30 or 300 of Fig. 3 or tubes 47 or 407 of Fig. 4 correspond to the code relays T1 and T2, etc., of Figs. 1 and 2 and that the additional tubes, such as tubes 31 to 39 of Fig. 3 correspond to resistances 11 to 19 of Fig. 1, etc.

With reference to Fig. 3, when a seven-digit code, such as 255, is registered, relays A0(3), A2(3), B1(3), B4(3), C1(3) and C4(3) are operated. After the fourth or "D" digit has been registered, steering relay ES(3) operates as previously described. Relay ES(3), upon operating, operates relay CDS(3) in an obvious circuit over contacts of relays ES(3) and MST(3). Relay CDS(3), upon operating, applies a positive voltage, say 130 volts, over its contact to the main anode 2 of gas tube CD(3) through resistance 312, to one element of each of the gas tubes 31 to 39 and 30 through resistance 310, and to one element of other gas tubes 301 to 309 and 300 through resistance 311. In this embodiment the firing of tube CD(3) is incident to the registration of an eight-digit code. The firing of tube CD(3) is a result of the firing of any one of tubes 30, 300, etc. with all of the respective associated tubes 31 to 39, 301 to 309 extinguished. All of these tubes, including tube CD(3), may be arranged to ionize on a minimum firing potential of about 70 volts and to sustain a discharge at about 60 volts.

With the above code 255 registered, it will be observed that the left electrode of each of tubes 35, 36 and 39, associated with tube 30, is grounded; likewise, the left electrode of each of tubes 301, 305, 307 and 309, associated with tube 300, is grounded. The tube 30 is assigned to the eight-digit code 298 and the tube 300 is assigned to the eight-digit code 367, similarly to relays T1(1), T2(1), and T1(2), T2(2) of Figs. 1 and 2, above discussed. At least one tube, say tube 35, of the group of tubes 31 to 39 will fire due to the presence of substantially 130 volts across its gap. When tube 35 fires, it remains conducting at its sustaining voltage of about 60 volts thereby dropping the voltage at the left electrode of tube 30 to about not more than 70 volts positive with respect to ground (more likely about 60 volts). Tube 30 may fire under the pressure of this 70 volts; but, if it does, it will remain conducting and cause about a 60-volt drop across its gap in order to sustain the discharge. This will produce, at the most, about a 10-volt positive pulse at the junction of resistances 314 and 315 which, in conjunction with the negative potential on the cathode 4 of tube CD(3), which may be about 50 volts, will cause, at the most, about a 60-volt positive pulse on the starter electrode 1 of tube CD(3) will respect to the cathode 4 of tube CD(3). This condition will not fire tube CD(3) since at least 70 volts is required to ionize tube CD(3). The same action will take place in the group of tubes 301 to 309 whereby at least one tube, say tube 301, fires with or without the concurrent firing of the code tube 300. Whether or not tubes 30 and 300 fire concurrently with their associated nine tubes, tube CD(3) will not receive sufficient firing potential to ionize. Thus relay CD(3) will not be operated in response to registration of a seven-digit code such as 255.

If tube 30, for instance, should fire before one of its associated tubes 31 to 39 fires in response to the registration of a seven-digit code, there will be an instantaneous pulse produced at the junction of resistances 314 and 315 of about 70 volts positive, at the most, with respect to ground (due to the 60-volt sustaining voltage consumed by tube 30) which normally would be sufficient (some 120 volts positive with respect to cathode 4 of the CD(3) tube) to fire tube CD(3). In order that this pulse shall not affect tube CD(3) under these circumstances, a delay network comprising resistance 314 and condenser 316 is provided to delay the effect at electrode 1 of tube CD(3) of such pulses until the group of tubes 30 to 39 has become stabilized. Even if tube 30 fires ahead of say tube 35 in the above example, tube 35 will fire a very short interval of time later to either extinguish tube 30 or reduce the pulse at the junction of resistances 314 and 315. The time constant of the delay network should therefore be sufficient to prevent the firing of tube CD(3) in response to any such inadvertent short pulse caused by the firing of tube 30 ahead of say tube 35.

At the start of the registration of the sixth digit, relay ES(3) is released, thereby releasing relay CDS(3) and extinguishing any tubes such as 35, 30, 301, 300, etc., which may have become conducting in response to the registration of the seven-digit code 255.

After the seventh or "G" digit is registered, relay HS(3) is operated. Upon the operation of relay HS(3) a circuit is completed for operating the marker start relay MST(3) extending from ground, over the contact of relay HS(3), punching G(3), contact 3 of relay CD(3), punching MST(3), to battery through the winding of relay MST(3). The operation of relay MST(3), as above outlined, initiates circuit operations whereby an idle marker may be seized.

The seized marker has access to the office code register relays over cable 319, the amount of voltage on the conductors of cable 319 from the marker being insufficient to cause tubes such as 31 to 39 or 301 to 309, etc., to fire.

It will, of course, be obvious that there may be more than two code tubes such as 30 and 300 for other eight-digit codes. Two such tubes are considered sufficiently illustrative of the utility of the invention.

Whenever an eight-digit code, such as 298 peculiar to tube 30, is registered, relays A0(3), A2(3), B2(3), B7(3), C1(3) and C7(3) are operated. Under these circumstances, it will be apparent, from an inspection of the cross-connections on Fig. 3 to tubes 31 to 39 and 301 to 309, that none of the tubes 31 to 39 for tube 30 will be fired but that at least one of the tubes 301, 306 and 307 for tube 300 will be fired. It will be realized furthermore, and this comment applies equally to preceding discussion, that as soon as one tube of a group, say tube 301, fires it will prevent others of the same group from firing by virtue of the reduction of available firing potential to the 60-volt sustaining voltage of the first conducting tube. Since none of the tubes 31 to 39 conducts, tube 30 will fire and will cause the potential at the junction of resistances 314 and 315 to rise to about 70 volts positive with respect to ground which produces a starter electrode potential on tube CD(3) which is some 120 volts positive with respect to the negative 50-volt cathode 4. In order to raise the junction of resistances 314 and 315 to 70 volts positive with respect to ground, resistance 315 must be relatively large compared to resistances 310, 311, etc., such as a hundred times as large. Tube CD(3) will thereupon fire and will continue to conduct until relay CDS(3) is released upon the release of relay ES(3) at the start of the sixth digit registration. Tube CD(3), upon conducting, operates relay CD(3) in a circuit extending from negative battery, through the winding of relay CD(3), cathode 4 of tube CD(3), across the main gap of tube CD(3), main anode 2 of tube CD(3), resistance 312, contact of relay CDS(3), to positive battery. Relay CD(3) operates and locks over its contact 1 to ground through resistance 317.

The firing of tube 30 with none of the tubes 31 to 39 conducting will prevent the firing of tubes such as tube 300 by raising the potential on the right electrode of tubes such as 300 to about 70 volts positive with respect to ground. This prevents sufficient firing potential to be effective across the gap in tubes such as tube 300.

After the seventh or "G" digit is registered, relay HS(3) is operated. Relay HS(3), upon operating, completes a circuit from ground, over the contact of relay HS(3), punching G(3), contact 2 of relay CD(3), over punching DL(3) to the delay timer 318. The timer 318, as has been explained, times a delay period of from three to five seconds after the grounding of punching DL(3) and then grounds punching MST(3) to operate relay MST(3), as previously described. Thus, the registration of an eight-digit code (a seven-digit code plus "stations delay") has caused the operation of tube CD(3) thereby to alter the marker start function of the originating register circuit. Needless to say, other code tubes, such as tube 300 for the eight-digit code 367, may be provided for causing tube CD(3) to operate relay CD(3) whenever any code is registered which corresponds to the cross-connection to a tube 30, 300, etc.

The presence of the tubes, such as the group 31 to 39 or the group 301 to 309, prevents "back-ups" from one code to another. For example, if relay A1(3) were operated, tube 31 would conduct, dropping the voltage at the right electrodes of tubes 31 and 32, etc., to about 60 volts. There is a circuit extending, from this point through tube 32, to terminal A4(3) (assumed to be ungrounded), through tube 302, to the right electrode of tube 302 which may be at about +130 or about +60 depending upon the condition of tubes 301 to 309. In neither case, however, will there be sufficient potential across these two tubes 32 and 302 to fire and sustain both in series.

The variety of the invention disclosed in Fig. 4 is a rearrangement of the gas tube variety shown in Fig. 3 whereby, as was the case with the embodiment shown in Fig. 2, six instead of nine controlling elements, such as tubes 41 to 46, are employed. Positive and negative potential in Fig. 4 may be in the range of 125 to 135 volts, say 130 volts. The gas tubes employed may have a minimum firing potential of about 70 volts and a sustaining voltage in the area of 55 to 70 volts, say 60 volts. When none of the register relays A0(4) to C7(4) are operated, the left electrodes of all gas tubes 41 to 46 and 401 to 406 are connected to −130 volts through resistances 420 to 427, 430 to 437 and 440 to 447, etc., depending upon the eight-digit code represented by each of the code tubes 47, 407, etc. It is apparent that each resistance, such as resistance 422, may supply more than one gas tube, such as tubes 42 and 402. It will be assumed that under the worst loading condition for resistance 422 that there is a maximum drop across such resistance 422 of 50 volts (which may represent as many as a maximum of twenty tubes conducting therethrough).

When a seven-digit code, such as 255, is registered, relays A0(4), A2(4), B1(4), B4(4), C1(4) and C4(4) are operated. After the fourth or "D" digit has been registered relay ES(4) operates as previously described. Relay ES(4), upon operating, operates relay CDS(4) in a circuit extending from ground, over the contact of relay ES(4), contact 1 of the marker start relay MST(4), through the winding of relay CDS(4), to battery through the resistance 416. Relay CDS(4), upon operating, grounds the anode 2 of tube CD(4) over contact 2 of relay CDS(4), and, over contact 1 of relay CDS(4) applies positive battery through resistances such as 408 and 409 to the respective groups 41 to 46 and 401 to 406 of gas tubes representing the respective eight-digit codes.

With the code 255 registered, it will be apparent that the left electrodes of gas tubes 41, 42 and 45 are grounded over respective contacts 1 and 3 of relay CO3(4) and contact 2 of relay CO1(4), and over contacts of respective relays A0(4), A2(4) and C1(4). The left electrodes of tubes 43, 44 and 46 are connected to negative battery over respective contacts 3 and 5 of relay CO2(4) and contact 5 of relay CO1(4), and through respective resistances 432, 437 and 447.

Any tube whose left electrode is grounded, such as tube 41, may fire from ground on its left electrode to positive battery through the relatively high impedance, such as resistance 408 which may be about 3.3 megohms. If such a tube fires and sustains a discharge the right-hand electrode will then be at a potential of about +65 volts (the sustaining voltage having been assumed as 65 volts).

Any tube whose left electrode is connected to negative battery through a resistance, such as tube 43 through resistance 432, which resistance 432 may be relatively low such as 33,000 ohms, may fire in this circuit to positive battery through the common high impedance load 408. Under these circumstances there may, as above mentioned, be a maximum drop of say 50 volts across resistance 432 or a minimum of perhaps 2.5 volts (which is negligible for discussion purposes). Depending upon the voltage drop in resistance 432 and assuming tube 43 to have a sustaining voltage of 60 volts, when and if tube 43 fires and sustains a discharge, the potential at the right electrode of tube 43 could be anything within the range of —70 to —20 volts. Since resistance 408 is of relatively high impedance compared to resistance 432 for example, the potential on the right-hand electrodes of tubes 41 to 46 will be controlled by the low impedance source (negative battery through low resistance 432 in this instance). If the negative potential on the right electrodes of tubes 41 to 46 was large enough to fire one of the grounded tubes 41, 42 or 45, the potential would then be determined by the lowest sustaining voltage of the group of grounded tubes.

This would mean that under the condition where some of a group of tubes, such as tubes 41 to 46, are grounded and some are connected through resistances to —130 volts, which is the condition imposed by a seven-digit office code, one of the ungrounded tubes, say tube 43, will conduct. Since the voltage drop through a resistance, such as resistance 432, may be 50 volts or less, as previously explained, the left side of the conducting tube, say tube 43, will be at a potential in the region of —130 to —80 volts, and since the voltage drop across tube 43 (due to its sustaining potential of say 60 volts) is about 60 volts, the right side of tube 43 will be somewhere in the range of —70 to —20 volts with respect to ground. It is thus apparent that the left side of tube 47, for instance, cannot be more positive than —20 volts with respect to ground and, in the event that a grounded tube, such as tube 41, fires in series with tube 43, the additional voltage drop in resistance 432 will drop the potential on the right side of tubes 41 to 46 to less than the sustaining potential of tube 41, say —60 volts.

The same situation exists for the group of tubes 401 to 406 for which tubes 402 and 404 are grounded and tubes 401, 403, 405 and 406 are connected to low resistance negative battery.

Under the foregoing conditions (the right electrodes of tubes 41 to 46 not being more positive than 20 volts negative with respect to ground, nor more negative than 60 volts negative with respect to ground) one of the tubes 47, 407, etc., will be fired because the firing circuit is never less than 70 volts from the left electrodes of tubes 47, 407, etc., to negative battery through the high impedance (say 10 megohms) of resistance 412. If more than one tube 47, 407, etc. fires, the one which has the most negative potential on its left electrode will be the only tube to sustain its discharge. This is because the sustaining potential will drop the potential of all of the right-hand electrodes of tubes 47, 407, etc., below the value necessary to sustain the other tubes 47, 407, etc.

Assuming tube 47 to fire and to sustain at 60 volts, the 60-volt drop across tube 47 will raise the potential at the top of resistance 412 to a value which can never be more positive than about 80 volts negative with respect to ground. Since the potential on the cathode 4 of tube CD(4) is about —130 volts, the voltage across the control gap of tube CD(4) will be at most merely 50 volts in the direction of polarity necessary for ionization. Thus tube CD(4) will not fire and relay CD(4) cannot operate.

Thus tube CD(4) is never fired in response to the registration of a seven-digit code.

At the start of the registration of the sixth or "F" digit, relay ES(4) is released to release relay CDS(4). The release of relay CDS(4) extinguishes all gas tubes in Fig. 4.

After the seventh or "G" digit has been registered, relay HS(4) operates as previously described. Upon the operation of relay HS(4), a circuit is completed for operating the marker start relay MST(4) extending from ground, over the contact of relay HS(4), punching G(4), contact 3 of relay CD(4), punching MST(4), resistance 415, to battery through the winding of relay MST(4).

Relay MST(4), upon operating at the end of the registration of the seventh or "G" digit, effects, as previously described, the start of marker seizure operation. Relay MST(4), upon operating, operates the disconnecting relays CO1(4), CO2(4) and CO3(4) in a circuit extending from ground, over contact 2 of relay MST(4), resistance 49, to battery through the windings in parallel of relays CO1(4), CO2(4) and CO3(4). Relays CO1(4), CO2(4) and CO3(4), upon operating, disconnect the contacts of the register relays A0(4) to C7(4) from the gas tubes to prevent possible interference when the seized marker seeks to obtain the registered information over cable 414.

If an eight-digit code, say 298 peculiar to gas tube 47, is registered, at least one of the sets of gas tubes, such as tubes 41 to 46, will have all of its tubes grounded. Relays A0(4), A2(4), B2(4), B7(4), C1(4) and C7(4) will be operated. Under these circumstances the left electrodes of each of the tubes 41 to 46 will be grounded whereupon at least one of these tubes will fire and the potential on their right electrodes will be determined by the sustaining potential, say 60 volts, of the tube having the lowest sustaining potential. This potential will thus be about 60 volts positive with respect to ground. In other sets of tubes, such as tubes 401 to 406 associated with the code tube 407 peculiar to the eight-digit code 367, some of the tubes will be grounded (such as tubes 402, 403 and 406), while the others will be connected to low resistance battery (such as tubes 401, 404 and 405). As previously explained, the set of tubes 401 to 406 will be fired and their right electrodes will be at a potential in the range of —70 to —20 volts. This means that tube 407 could fire and that the right-hand electrode of tube 407 thereby could be driven to a potential within the range of —120 to —80 volts. However, tube 47 will also fire and when it does, its right electrode is driven to about zero or ground potential thereby extinguishing tubes such as 407 which may have fired under the above-described condition. The net effect of the entire operation is to drive the top of resistance 412 to substantially zero or ground potential which is some 130 volts positive with respect to the cathode of tube CD(4). Tube CD(4) is thereupon fired to operate relay CD(4).

Relay CD(4) operates and locks over its contact 1 to ground through resistance 410 thereby extinguishing tube CD(4). Thus the registration of an eight-digit code has resulted in the firing of tube CD(4) and the operation of relay CD(4). Relay ES(4) is released at the start of the registration of the sixth digit, thereby to release relay CDS(4) and extinguish all gas tubes of Fig. 4.

When relay HS(4) operates at the end of the registration of the seventh or "G" digit, a circuit is completed for energizing the delay timer 48 extending from ground, over the contact of relay HS(4), punching G(4), contact 2 of relay CD(4), punching DL(4), to the delay timer 48. The delay timer 48, after the lapse of from three to five seconds after the grounding of punching DL(4), grounds punching MST(4) to operate relay MST(4) as before. The operation of relay MST(4) is however delayed long enough for the registration of the eighth or party digit if such be forthcoming. Thus the registration of an eight-digit office code has caused the marker start signal to be effective only after the registration of seven digits plus a length of time within which an eighth digit may be registered.

Relay MST(4), upon operating, operates the disconnecting relays CO1(4), CO2(4) and CO3(4) as previously in order to preclude interference between a subsequently seized marker and the gas tube circuits when a marker seeks the registered information over cable 414.

Whenever the expression "resistance potential" or equivalent is used in the specification or claims, it is used to mean a potential supplied to the point in question through a resistance which may be a pure resistance or the resistance component of an impedance.

It is to be understood that the above-described arrangements are illustrative of the application of the principles of the invention. Numerous other arrangements may be devised by those skilled in the art without departing from the spirit and scope of the invention.

What is claimed is:

1. A translating arrangement comprising means for registering plural character codes, a group of conductors for each code character divisible into at least a first and a second set of conductors for each group, said means responsive to registration therein of code characters to establish different potentials on at least said first and said second sets of conductors of each group according to the registered code, and an indicating device for each code in circuit with only the conductors of a first set for each group in accordance with the code individual to said device.

2. A translating arrangement comprising means for registering plural character codes, a group of conductors for each code character divisible into a first and a second set of conductors for each group, said means responsive to registration therein of code characters to establish different potentials on said first and said second sets of conductors of each group according to the registered code, and an indicating device for each code in circuit with only the conductors of a first set for each group in accordance with the code individual to said device.

3. A translating arrangement comprising means for registering plural character codes, five conductors for each code character divisible into a first set of two conductors and a second set of three conductors, said means responsive to registration therein of code characters to establish different potentials on said first and said second sets of conductors according to the registered code, and an indicating device for each code in circuit with only the conductors of one of said sets for each code character in accordance with the code individual to said device.

4. A translating arrangement comprising three registers for registering the digits of a three-digit code, five conductors for each code divisible into a first set of two conductors and a second set of three conductors, each register responsive to registration therein of a digit to establish different potentials on said first and said second sets of conductors according to the registered digit, and an indicating device for each code in circuit with only the conductors of one of said sets for each digit in accordance with the code individual to said device.

5. A translating arrangement comprising means for registering plural character codes, a group of conductors for each code character divisible into a first and a second set of conductors for each group, said means responsive to registration therein of code characters to alter the potential on one set of said conductors of each group according to the registered code, and an indicating device for each code in circuit with all conductors except said conductors of said one set of each group whose potentials are altered by said means in response to registration therein of the code individual to said device.

6. A translating arrangement comprising means for registering plural character codes, a group of conductors for each code character, said means responsive to registration therein of code characters to alter the potential of certain conductors of each group according to the registered code, and an indicating device for each code in circuit with all conductors except said certain conductors whose potentials are altered by said means in response to registration therein of the code individual to said device.

7. A translating arrangement comprising means for registering plural character codes, a group of normally deenergized conductors for each code character, said means responsive to registration therein of code characters to energize certain conductors of each group according to the registered code, and an indicating device for each code in circuit with all conductors except said certain conductors energized by said means in response to registration therein of the code individual to said device.

8. A translating arrangement comprising means for registering plural character codes, a group of normally ungrounded conductors for each code character, said means responsive to registration therein of code characters to ground certain conductors of each group according to the registered code, and an indicating device for each code in circuit with all conductors except said certain conductors grounded by said means in response to registration therein of the code individual to said device.

9. A translating arrangement comprising means for registering plural character codes, a group of normally deenergized conductors for each code character, said means responsive to registration therein of code characters to energize certain conductors of each group on a combination basis according to the registered code, and an electron discharge device for each code in circuit with all conductors except said certain conductors energized by said means in response to registration therein of the code individual to said device.

10. A translating arrangement comprising means for registering plural character codes, five normally deenergized conductors for each code character, said means responsive to registration therein of code characters to energize two conductors of each group on a combination basis according to the registered code, and an electron discharge device for each code in circuit with the three conductors of each group which remain deenergized upon the response of said means to registration therein of the code individual to said device.

11. A translating arrangement comprising three registers for registering the digits of a three-digit code, five normally deenergized conductors for each digit, each register responsive to registration therein of a digit to energize two conductors of its associated group on a combination basis according to the registered digit, and an electron discharge device for each code in circuit in multiple with the three conductors of each group which remain deenergized upon the response of said registers to registration therein of the code individual to said device.

12. A translating arrangement comprising three registers for registering the digits of a three-digit code, five normally deenergized conductors for each digit, each register responsive to registration therein of a digit to energize two conductors of its associated group on a combination basis according to the registered digit, nine electron discharge devices for each code, and a tenth electron discharge device for each code connected through said nine devices in multiple with the three conductors of each group which remain deenergized upon the response of said registers to registration therein of the code individual to said device.

13. A translating arrangement comprising three registers for registering the digits of a three-digit code, five normally deenergized conductors for each digit, each register responsive to registration therein of a digit to energize two conductors of its associated group on a combination basis according to the registered digit, nine electron discharge devices for each code, and a tenth electron discharge device for each code connected through said nine devices in multiple with the three conductors of each group which remain deenergized upon the response of said registers to registration therein of the code individual to said device, a source of potential connected to the common connection between said tenth device and said nine devices, whereby said tenth device sustains an electron discharge therethrough in response to the registration in said registers of only the code individual to said tenth device, and means for indicating the electron discharge through any of said tenth devices.

14. The invention as claimed in claim 10 wherein the said potential is resistance potential and the said devices are gas tubes.

15. A translating arrangement comprising means for registering plural character codes, a group of normally deenergized conductors for each code character, said means responsive to registration therein of code characters to energize certain conductors of each group on a combination basis according to the registered code, and a relay for each code in circuit with all conductors except said certain conductors energized by said means in response to registration therein of the code individual to said relay.

16. A translating arrangement comprising means for registering plural character codes, five normally deenergized conductors for each code character, said means responsive to registration therein of code characters to energize two conductors of each group on a combination basis according to the registered code, and a relay for each code in circuit with the three conductors of each group which remain deenergized upon the response of said means to registration therein of the code individual to said relay.

17. A translating arrangement comprising three registers for registering the digits of a three-digit code, five normally deenergized conductors for each digit, each register responsive to registration therein of a digit to energize two conductors of its associated group on a combination basis according to the registered digit, and a neutral relay for each code in circuit in multiple with the three conductors of each group which remain deenergized upon the response of said registers to registration therein of the code individual to said relay.

18. A translating arrangement comprising three registers for registering the digits of a three-digit code, five normally deenergized conductors for each digit, each register responsive to registration therein of a digit to energize two conductors of its associated group on a combination basis according to the registered digit, nine resistances for each code, and a neutral relay for each code connected through said resistances in multiple with the three conductors of each group which remain deenergized upon the response of said registers to registration therein of the code individual to said relay.

19. A translating arrangement comprising three registers for registering the digits of a three-digit code, five normally deenergized conductors for each digit, each register responsive to registration therein of a digit to energize two conductors of its associated group on a combination basis according to the registered digit, nine resistances for each code, and a neutral relay for each code connected through said resistances in multiple with the three conductors of each group which remain deenergized upon the response of said registers to registration therein of the code individual to said relay, whereby said relay is operated in response to the registration in said registers of any code except the code individual to said relay, and means for indicating the concurrent operation of all of said relays.

20. A translating arrangement comprising means for registering plural character codes, a group of conductors for each code character divisible into a first and a second set of conductors for each group, said means responsive to registration therein of code characters to alter the potential on one set of said conductors of each group according to the registered code, and an indicating device for each code in circuit with only said conductors of said one set of each group whose potentials are altered by said means in response to registration therein of the code individual to said device.

21. A translating arrangement comprising means for registering plural character codes, a group of conductors normally having potential thereon for each code character and divisible into a first and a second set of conductors for each group, said means responsive to registration therein of code characters to alter the potential on one set of conductors of each group according to the registered code, and an indicating device for each code in circuit with only said conductors of said one set of each group whose potentials are altered by said means in response to registration therein of the code individual to said device.

22. A translating arrangement comprising means for registering plural character codes, a group of conductors for each code character, said means responsive to registration therein of code characters to alter the potential of certain conductors of each group according to the registered code, and an indicating device for each code in circuit with only said certain conductors whose potentials are altered by said means in response to registration therein of the code individual to said device.

23. A translating arrangement comprising means for registering plural character codes, a group of conductors normally having potential thereon for each code character, said means responsive to registration therein of code characters to make more positive the potential on certain conductors of each group according to the registered code, and an indicating device for each code in circuit with only all of said certain conductors whose potential is altered by said means in response to registration therein of the code individual to said device.

24. A translating arrangement comprising means for registering plural character codes, a group of conductors normally having potential thereon for each code character, said means responsive to registration therein of code characters to make more positive the potential on certain conductors of each group on a permutation basis according to the registered code, and an electron discharge device for each code in circuit with only all of said conductors whose potential is altered by said means in response to registration therein of the code individual to said device.

25. A translating arrangement comprising means for registering plural character codes, five conductors normally having potential thereon for each code character, said means responsive to registration therein of code characters to make more positive the potential on two conductors of each group on a permutation basis according to the registered code, and an electron discharge device for each code in circuit with the two conductors of each group whose potential is altered by said means in response to registration therein of the code individual to said device.

26. A translating arrangement comprising three registers for registering the digits of a three-digit code, five conductors normally having potential thereon for each digit, each register responsive to registration therein of a digit to make more positive the potential on two conductors of its associated group on a permutation basis according to the registered digit, and an electron discharge device for each code in circuit in multiple with the two conductors of each group whose potential is altered upon the response of said registers to registration therein of the code individual to said device.

27. A translating arrangement comprising three registers for registering the digits of a three-digit code, five conductors normally having potential thereon for each digit, each register responsive to registration therein of a digit to make more positive the potential on two conductors of its associated group on a permutation basis according to the registered digit, six electron discharge devices for each code, and a seventh electron discharge device for each code connected through said six devices in multiple with the two conductors of each group whose potential is altered upon the response of said registers to registration therein of the code individual to said device.

28. A translating arrangement comprising three registers for registering the digits of a three-digit code, five conductors normally having potential thereon for each digit, each register responsive to registration therein of a digit to make more positive the potential on two conductors of its associated group on a permutation basis according to the registered digit, six electron discharge devices for each code, and a seventh electron discharge device for each code connected through said six devices in multiple with the two conductors of each group whose potential is altered upon the response of said registers to registration therein of the code individual to said device, a source of voltage connected to the common connection between said seventh device and said six devices, whereby said seventh device sustains an electron discharge therethrough in response to the registration in said registers of all codes, and means for indicating when such discharge is effected by registration of a code individual to one of said seventh devices.

29. The invention as claimed in claim 23 wherein the said voltage is a resistance voltage and the said devices are gas tubes.

30. A translating arrangement comprising means for registering plural character codes, a group of normally energized conductors for each code character, said means responsive to registration therein of code characters to deenergize certain conductors of each group according to the registered code, and an indicating device for each code in circuit with only all of said certain conductors deenergized by said means in response to registration therein of the code individual to said device.

31. A translating arrangement comprising means for registering plural character codes, a group of normally grounded conductors for each code character, said means responsive to registration therein of code characters to remove ground from certain conductors of each group according to the registered code, and an indicating device for each code in circuit with only all of said certain conductors ungrounded by said means in response to registration therein of the code individual to said device.

32. A translating arrangement comprising means for registering plural character codes, a group of normally energized conductors for each code character, said means responsive to registration therein of code characters to deenergize certain conductors of each group on a permutation basis according to the registered code, and a relay for each code in circuit with only all of said certain conductors deenergized by said means in response to registration therein of the code individual to said relay.

33. A translating arrangement comprising means for registering plural character codes, five normally energized conductors for each code character, said means responsive to registration therein of code characters to deenergize two conductors of each group on a permutation basis according to the registered code, and a relay for each code in circuit with the two conductors of each group which are deenergized upon the response of said means to registration therein of the code individual to said relay.

34. A translating arrangement comprising three registers for registering the digits of a three-digit code, five normally energized conductors for each digit, each register responsive to registration therein of a digit to deenergize two conductors of its associated group on a permutation basis according to the registered digit, and a neutral relay for each code in circuit in multiple with the two conductors of each group which are deenergized upon the response of said registers to registration therein of the code individual to said relay.

35. A translating arrangement comprising three registers for registering the digits of a three-digit code, five normally energized conductors for each digit, each register responsive to registration therein of a digit to deenergize two conductors of its associated group on a permutation basis according to the registered digit, six resistances for each code, and a neutral relay for each code connected through said resistances in multiple with the two conductors of each group which are deenergized upon the response of said registers to registration therein of the code individual to said relay.

36. A translating arrangement comprising three registers for registering the digits of a three-digit code, five normally energized conductors for each digit, each register responsive to registration therein of a digit to deenergize two conductors of its associated group on a permutation basis according to the registered digit, six resistances for each code, and a neutral relay for each code connected through said resistances in multiple with the two conductors of each group which are deenergized upon the response of said registers to registration therein of the code individual to said relay, whereby said relay is operated in response to the registration in said registers of any code except the code individual to said relay, and means for indicating the concurrent operation of all of said relays.

References Cited in the file of this patent

UNITED STATES PATENTS

| Number | Name | Date |
|---|---|---|
| 1,872,558 | Bellamy | Aug. 16, 1932 |
| 2,248,937 | Bellamy | July 15, 1941 |
| 2,275,039 | Albert | Mar. 3, 1942 |
| 2,283,395 | Strickler | May 19, 1942 |
| 2,298,699 | Hubbard | Oct. 13, 1942 |
| 2,320,081 | Holden | May 25, 1943 |
| 2,364,445 | Hubbard | Dec. 5, 1944 |
| 2,369,474 | Luhn | Feb. 13, 1945 |
| 2,518,022 | Keister | Aug. 8, 1950 |
| 2,542,800 | Dehn et al. | Feb. 20, 1951 |
| 2,559,312 | Newsom | July 3, 1951 |
| 2,585,904 | Busch | Feb. 19, 1952 |
| 2,603,716 | Low | July 15, 1952 |